(12) United States Patent
Falé

(10) Patent No.: US 10,897,539 B1
(45) Date of Patent: Jan. 19, 2021

(54) METHOD FOR VISUAL-BASED PROGRAMMING OF SELF-SERVICE WORKFLOW

(71) Applicant: Talkdesk, Inc., San Francisco, CA (US)

(72) Inventor: David Falé, San Francisco, CA (US)

(73) Assignee: TALKDESK INC., San Francisco, CA (US)

( * ) Notice: Subject to any disclaimer, the term of this patent is extended or adjusted under 35 U.S.C. 154(b) by 0 days.

(21) Appl. No.: 16/671,056

(22) Filed: Oct. 31, 2019

(51) Int. Cl.
*H04M 3/51* (2006.01)
*H04M 3/523* (2006.01)
*G10L 15/26* (2006.01)
*H04M 3/493* (2006.01)

(52) U.S. Cl.
CPC ....... *H04M 3/5183* (2013.01); *H04M 3/5166* (2013.01); *H04M 2201/42* (2013.01)

(58) Field of Classification Search
CPC .. H04M 3/5175; H04M 3/493; H04M 3/5191; H04M 2201/42; H04M 2203/355
USPC ....... 379/265.09, 265.05, 247, 265.02, 88.01
See application file for complete search history.

(56) References Cited

U.S. PATENT DOCUMENTS

| | | | |
|---|---|---|---|
| 2004/0141508 A1* | 7/2004 | Schoeneberger | H04L 67/10 370/401 |
| 2012/0072405 A1 | 3/2012 | Guay et al. | |
| 2014/0314225 A1* | 10/2014 | Riahi | H04M 3/5183 379/265.09 |
| 2014/0369485 A1* | 12/2014 | Hollander | H04M 3/5166 379/265.02 |
| 2015/0310446 A1 | 10/2015 | Tuchman et al. | |

OTHER PUBLICATIONS

U.S. Appl. No. 16/671,060, filed Oct. 31, 2019, David Falé et al.
U.S. Appl. No. 16/671,063, filed Oct. 31, 2019, David Falé et al.

* cited by examiner

*Primary Examiner* — Thjuan K Addy

(57) ABSTRACT

A system is provided that employs visual-based programming for self-service knowledge center and workflow. The visual-based programming employs modularized executable instructions that can be instantiated a graphical element that can be quickly assembled and/or linked to other modularized executable instructions without programming language proficiencies.

20 Claims, 6 Drawing Sheets

METHOD FOR VISUAL-BASED PROGRAMMING OF SELF-SERVICE WORKFLOW

BACKGROUND

Modern contact centers use a variety of technology to attempt to efficiently address customer issues. As the number of available communication channels or means of interacting with the customers increases, e.g., via telephone, video chat, social media, electronic communication (e-mail), chat messaging, one of the most efficient and cost-effective means to address a customer's issue is still to have the customer resolve their own issues and questions and avoid needing an agent having to interact with a customer in the first place. Self-service knowledge center are highly an efficient means to direct a customer to a solution without need to an agent. Workflow of self-service knowledge center may be very complex, and the reconfirmation of self-service knowledge center often requires a certain degree of programming proficiencies.

SUMMARY

A system is provided that employs visual-based programming for self-service knowledge center and workflow. The visual-based programming employs modularized executable instructions that can be instantiated a graphical element that can be quickly assembled and/or linked to other modularized executable instructions without programming language proficiencies.

As used herein, a "knowledge base" is a library of information about a company's product or service that are guided or curated to help customers find answers to solve problems on their own. Knowledge base is used interchangeably with the term knowledge center.

As used herein, the term "agent" refers a person that is employed or contracted at the contact center to perform a function or service for a customer, who is also a person. The service or function provided may be related to services for new customers such as telemarketing, information gathering, or claim processing, as well as services for existing customer such as customer service, technical support, fraud prevention, and the like. The term "customer" as used herein also refers to a person.

As used herein, the term "agent mobile device" refers to a mobile device used by an agent in the context of contact center operations and workflow. Mobile device refers to a portable computing device such as a smartphone, mobile phone, portable computer, or tablet computer configured to operate in a broadband wireless network, mobile broadband network, LTE network, GSM network, CDMA network, 5G network, or the like. Mobile broadband generally refers to wireless Internet access through a built-in or external modem. Wireless broadband generally refers to high-speed wireless Internet access or computer networking access over a wide area.

In an aspect, a computer implemented method is disclosed to configure a self-service knowledge center, the method comprising generating, by a processor of a first computing device, a graphical user interface for a programming workspace, the programming workspace comprising one or more user selectable input to add a software module associated with flow of a self-service knowledge center and one or more software modules to invoke an interaction session request between a user and an agent of a contact center, wherein the interaction session request comprises a chat messing interaction and/or a voice interaction; wherein the workspace is used to generate executable code for execution by a web server to host the self-service knowledge center.

In another aspect, a system is disclosed to configure a self-service knowledge center, the system comprising a processor; and a memory having instructions stored thereon, wherein execution of the instructions by the processor cause the processor to generate a graphical user interface for a programming workspace, the programming workspace comprising one or more user selectable input to add a software module associated with flow of a self-service knowledge center and one or more software modules to invoke an interaction session request between a user and an agent of a contact center, wherein the interaction session request comprises a chat messing interaction and/or a voice interaction; wherein the workspace is used to generate executable code for execution by a web server to host the self-service knowledge center.

In another aspect, a non-transitory computer readable medium is disclosed to configure a self-service knowledge center, the computer readable medium comprising instructions stored thereon, wherein execution of the instructions by the processor cause the processor to generate a graphical user interface for a programming workspace, the programming workspace comprising one or more user selectable input to add a software module associated with flow of a self-service knowledge center and one or more software modules to invoke an interaction session request between a user and an agent of a contact center, wherein the interaction session request comprises a chat messing interaction and/or a voice interaction; wherein the workspace is used to generate executable code for execution by a web server to host the self-service knowledge center.

BRIEF DESCRIPTION OF THE DRAWINGS

The components in the drawings are not necessarily to scale relative to each other. Like reference numerals designate corresponding parts throughout the several views.

FIG. 5 shows a second graphical user interface to program a self-service workflow.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described within a cloud-based contact center, it will become evident to those skilled in the art that the implementations are not limited thereto.

Disclosed herein are systems and methods that employ a multi-dimensional presence model to manage routing of interaction requests from customers to available agents over available omni-channels in contact centers. The multi-dimensional presence model employs multiple model states that define availability and capacity for a given agent or class of agents, including, but not limited to, an availability state of the agent, as well as occupancy, activity, device, and channel states to which a routing engine in the contact center can effectively route requested interactions of a customer with an agent.

Figure 1:
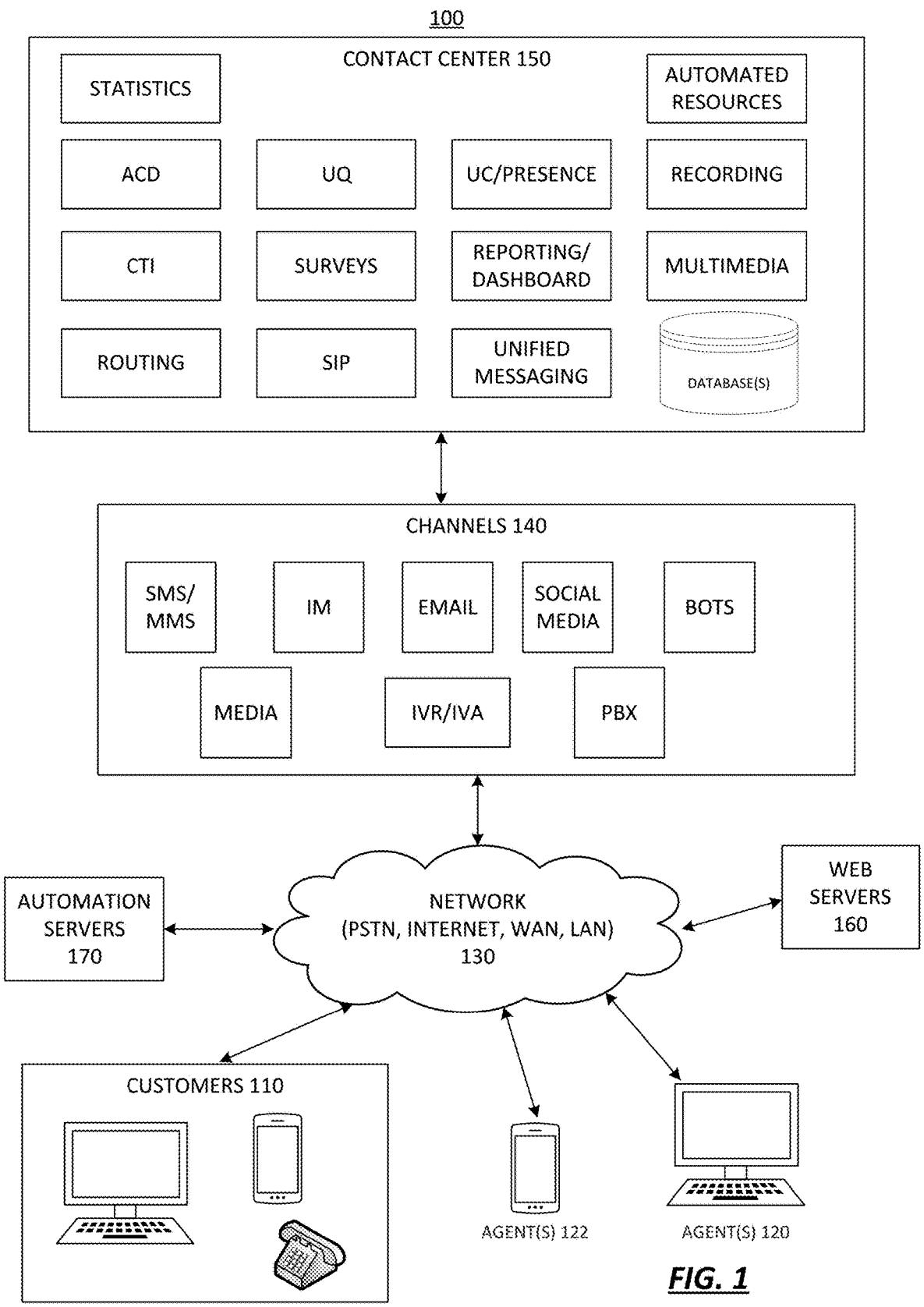
FIG. 1 illustrates an example environment.

FIG. 1 is an example system architecture 100, and illustrates example components, functional capabilities and optional modules that may be included in a cloud-based contact center infrastructure solution. Customers 110 interact with a contact center 150 using voice, email, text, and web interfaces in order to communicate with agent(s) 120 through a network 100 and one or more channels 140. The agent(s) 120 may be remote from the contact center 150 and handle communications with customers 110 on behalf of an enterprise or other entity. The agent(s) 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network. The network types are provided by way of example and are not intended to limit types of networks used for communications.

The contact center 150 may be cloud-based and distributed over a plurality of locations. The contact center 150 may include servers, databases, and other components. In particular, the contact center 150 may include, but is not limited to, a routing server, a SIP server, an outbound server, automated call distribution (ACD), a computer telephony integration server (CTI), an email server, an IM server, a social server, a SMS server, and one or more databases for routing, historical information and campaigns.

The routing server may serve as an adapter or interface between the switch and the remainder of the routing, monitoring, and other communication-handling components of the contact center. The routing server may be configured to process PSTN calls, VoIP calls, and the like. For example, the routing server may be configured with the CTI server software for interfacing with the switch/media gateway and contact center equipment. In other examples, the routing server may include the SIP server for processing SIP calls. The routing server may extract data about the customer interaction such as the caller's telephone number (often known as the automatic number identification (ANI) number), or the customer's internet protocol (IP) address, or email address, and communicate with other contact center components in processing the interaction.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered.

For inbound SIP messages, the routing server may use statistical data from the statistics server and a routing database to route the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

Customers 110 may initiate inbound communications (e.g., telephony calls, emails, chats, video chats, social media posts, etc.) to the contact center 150 via an end user device. End user devices may be a communication device, such as, a telephone, wireless phone, smart phone, personal computer, electronic tablet, etc., to name some non-limiting examples. Customers 110 operating the end user devices may initiate, manage, and respond to telephone calls, emails, chats, text messaging, web-browsing sessions, and other multi-media transactions. Agent(s) 120 and customers 110 may communicate with each other and with other services over the network 100. For example, a customer calling on telephone handset may connect through the PSTN and terminate on a private branch exchange (PBX). A video call originating from a tablet may connect through the network 100 terminate on the media server. The channels 140 are coupled to the communications network 100 for receiving and transmitting telephony calls between customers 110 and the contact center 150. A media gateway may include a telephony switch or communication switch for routing within the contact center. The switch may be a hardware switching system or a soft switch implemented via software. For example, the media gateway may communicate with an automatic call distributor (ACD), a private branch exchange (PBX), an IP-based software switch and/or other switch to receive Internet-based interactions and/or telephone network-based interactions from a customer 110 and route those interactions to an agent 120. More detail of these interactions is provided below.

As another example, a customer smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers 110 to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. IVA systems may cover a variety of media channels in addition to voice, including, but not limited to social media, email, SMS/MMS, IM, etc. and they may communicate with their counterpart's application (not shown) within the contact center 150. The IVA system may be configured with a script for querying customers on their needs. The IVA system may ask an open-ended questions such as, for example, "How can I help you?" and the customer 110 may speak or otherwise enter a reason for contacting the contact center 150. The customer's response may then be used by a routing server to route the call or communication to an appropriate contact center resource.

In response, the routing server may find an appropriate agent 120 or automated resource to which an inbound customer communication is to be routed, for example, based on a routing strategy employed by the routing server, and further based on information about agent availability, skills, and other routing parameters provided, for example, by the statistics server. The routing server may query one or more databases, such as a customer database, which stores information about existing clients, such as contact information, service level agreement requirements, nature of previous customer contacts and actions taken by contact center to resolve any customer issues, etc. The routing server may query the customer information from the customer database via an ANI or any other information collected by the IVA system.

Once an appropriate agent and/or automated resource is identified as being available to handle a communication, a connection may be made between the customer 110 and an agent device of the identified agent 120 and/or the automate resource. Collected information about the customer and/or the customer's historical information may also be provided to the agent device for aiding the agent in better servicing the communication. In this regard, each agent device may include a telephone adapted for regular telephone calls, VoIP calls, etc. The agent device may also include a computer for communicating with one or more servers of the contact center and performing data processing associated with contact center operations, and for interfacing with customers via voice and other multimedia communication mechanisms.

The contact center 150 may also include a multimedia/social media server for engaging in media interactions other than voice interactions with the end user devices and/or other web servers 160. The media interactions may be related, for example, to email, vmail (voice mail through email), chat, video, text-messaging, web, social media, co-browsing, etc. In this regard, the multimedia/social media server may take the form of any IP router conventional in the art with specialized hardware and software for receiving, processing, and forwarding multi-media events.

The web servers 160 may include, for example, social media sites, such as, Facebook, Twitter, Instagram, etc. In this regard, the web servers 160 may be provided by third parties and/or maintained outside of the contact center 160 that communicate with the contact center 150 over the network 100. The web servers 160 may also provide web pages for the enterprise that is being supported by the contact center 150. End users may browse the web pages and get information about the enterprise's products and services. The web pages may also provide a mechanism for contacting the contact center, via, for example, web chat, voice call, email, WebRTC, etc.

The integration of real-time and non-real-time communication services may be performed by unified communications (UC)/presence sever. Real-time communication services include Internet Protocol (IP) telephony, call control, instant messaging (IM)/chat, presence information, real-time video and data sharing. Non-real-time applications include voicemail, email, SMS and fax services. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

Recording applications may be used to capture and play back audio and screen interactions between customers and agents. Recording systems should capture everything that happens during interactions and what agents do on their desktops. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center.

Figure 2:
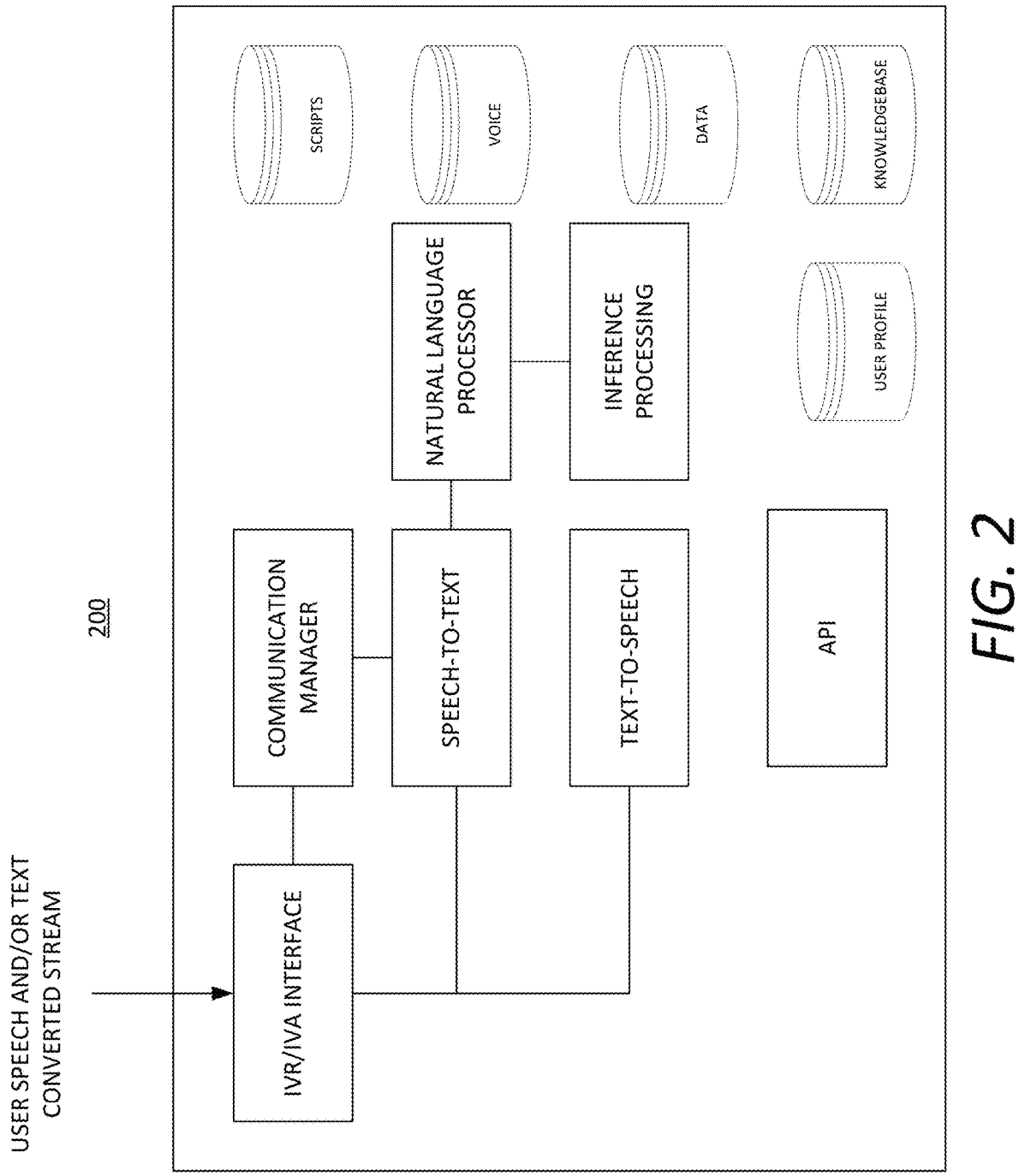
FIG. 2 illustrates example component that provide automation, routing and/or omnichannel functionalities within the context of the environment of FIG. 1.

With respect to the cloud-based contact center, FIG. 2 illustrates an example automation infrastructure 200 implemented within the cloud-based contact center 150. The automation infrastructure 200 may automatically collect information from a customer 110 user through, e.g., a user interface/voice interface 202, where the collection of information may not require the involvement of a live agent. The user input may be provided as free speech or text (e.g., unstructured, natural language input). This information may be used by the automation infrastructure 200 for routing the customer 110 to an agent 120, to automated resources in the contact center 150, as well as gathering information from other sources to be provided to the agent 120. In operation, the automation infrastructure 200 may parse the natural language user input using a natural language processing module 210 to infer the customer's intent using an intent inference module 212 in order to classify the intent. Where the user input is provided as speech, the speech is transcribed into text by a speech-to-text system 206 (e.g., a large vocabulary continuous speech recognition or LVCSR system) as part of the parsing by the natural language processing module 210. The communication manager 204 monitors user inputs and presents notifications within the user interface/voice interface 202. Responses by the automation infrastructure 200 to the customer 110 may be provided as speech using the text-to-speech system 208.

The intent inference module automatically infers the customer's 110 intent from the text of the user input using artificial intelligence or machine learning techniques. These artificial intelligence techniques may include, for example, identifying one or more keywords from the user input and searching a database of potential intents (e.g., call reasons) corresponding to the given keywords. The database of potential intents and the keywords corresponding to the intents may be automatically mined from a collection of historical interaction recordings, in which a customer may provide a statement of the issue, and in which the intent is explicitly encoded by an agent.

Some aspects of the present disclosure relate to automatically navigating an IVR system of a contact center on behalf of a user using, for example, the loaded script. In some implementations of the present disclosure, the script includes a set of fields (or parameters) of data that are expected to be required by the contact center in order to resolve the issue specified by the customer's 110 intent. In some implementations of the present disclosure, some of the fields of data are automatically loaded from a stored user profile. These stored fields may include, for example, the customer's 110 full name, address, customer account numbers, authentication information (e.g., answers to security questions) and the like.

Some aspects of the present disclosure relate to the automatic authentication of the customer 110 with the provider. For example, in some implementations of the present disclosure, the user profile may include authentication information that would typically be requested of users accessing customer support systems such as usernames, account identifying information, personal identification information (e.g., a social security number), and/or answers to security questions. As additional examples, the automation infrastructure 200 may have access to text messages and/or email messages sent to the customer's 110 account on the end user device in order to access one-time passwords sent to the customer 110, and/or may have access to a one-time password (OTP) generator stored locally on the end user device. Accordingly, implementations of the present disclosure may be capable of automatically authenticating the customer 110 with the contact center prior to an interaction.

In some implementations of the present disclosure an application programming interface (API) is used to interact with the provider directly. The provider may define a protocol for making commonplace requests to their systems. This API may be implemented over a variety of standard protocols such as Simple Object Access Protocol (SOAP) using Extensible Markup Language (XML), a Representational State Transfer (REST) API with messages formatted using XML or JavaScript Object Notation (JSON), and the like. Accordingly, a customer experience automation system 200 according to one implementation of the present disclosure automatically generates a formatted message in accordance with an API define by the provider, where the message contains the information specified by the script in appropriate portions of the formatted message.

Some aspects of the present disclosure relate to systems and methods for automating and augmenting aspects of an interaction between the customer 110 and a live agent of the contact center. In an implementation, once an interaction, such as through a phone call, has been initiated with the agent 120, metadata regarding the conversation is displayed to the customer 110 and/or agent 120 in the UI throughout the interaction. Information, such as call metadata, may be presented to the customer 110 through the UI 205 on the customer's 110 mobile device 105. Examples of such information might include, but not be limited to, the provider, department call reason, agent name, and a photo of the agent.

According to some aspects of implementations of the present disclosure, both the customer 110 and the agent 120 can share relevant content with each other through the application (e.g., the application running on the end user device). The agent may share their screen with the customer 110 or push relevant material to the customer 110.

In yet another implementation, the automation infrastructure 200 may also "listen" in on the conversation and automatically push relevant content from a knowledge base to the customer 110 and/or agent 120. For example, the application may use a real-time transcription of the customer's input (e.g., speech) to query a knowledgebase to provide a solution to the agent 120. The agent may share a document describing the solution with the customer 110. The application may include several layers of intelligence where it gathers customer intelligence to learn everything it can about why the customer 110 is calling. Next, it may perform conversation intelligence, which is extracting more context about the customer's intent. Next, it may perform interaction intelligence to pull information from other sources about customer 100. The automation infrastructure 200 may also perform contact center intelligence to implement workflow management (WFM)/workflow management automation (WFA) features of the contact center 150.

Self-Service Knowledge Center and Workflow

Figure 3:
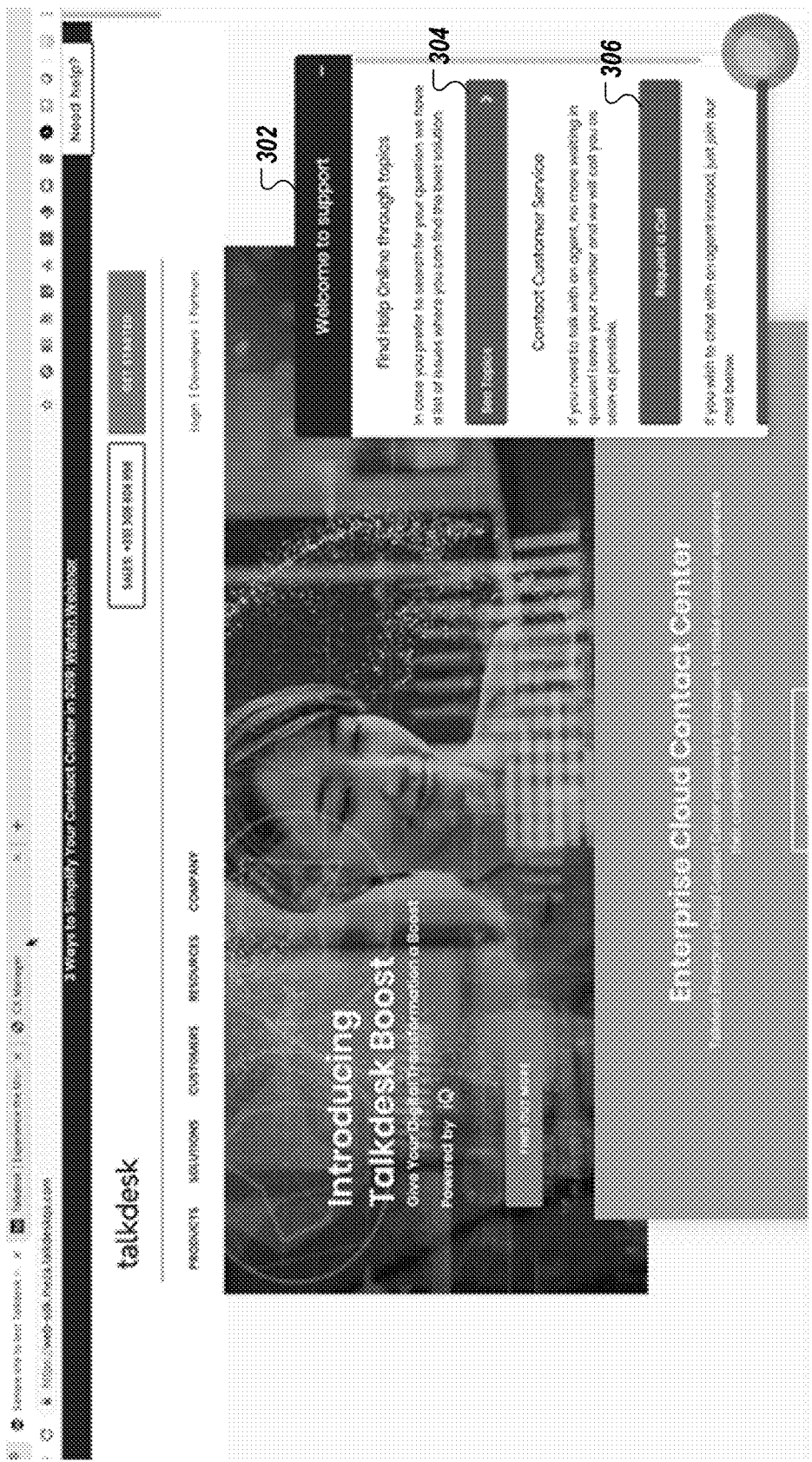
FIG. 3 illustrates an example web page configured with a visual-based programmed self-service workflow.

FIG. 3 illustrates an example web page 300 configured with a visual-based programmed self-service workflow 302. The web page 300 may be hosted by web server 160.

Self-service knowledge may include static and dynamic components that presents information according to a sequence. The goal of a service-service knowledge base is to define topics of interest to which customer can find answer or information relating to their problems or questions about a given set of products or services. Service-service knowledge base may include links to chat request, email request, or voice interaction with a contact center agent.

In FIG. 3, a service-service knowledge base is presented comprising a pull-down menu 304 with a list of topics of potential interest for the customer and a request input 306 for a call from an agent.

Figure 4:
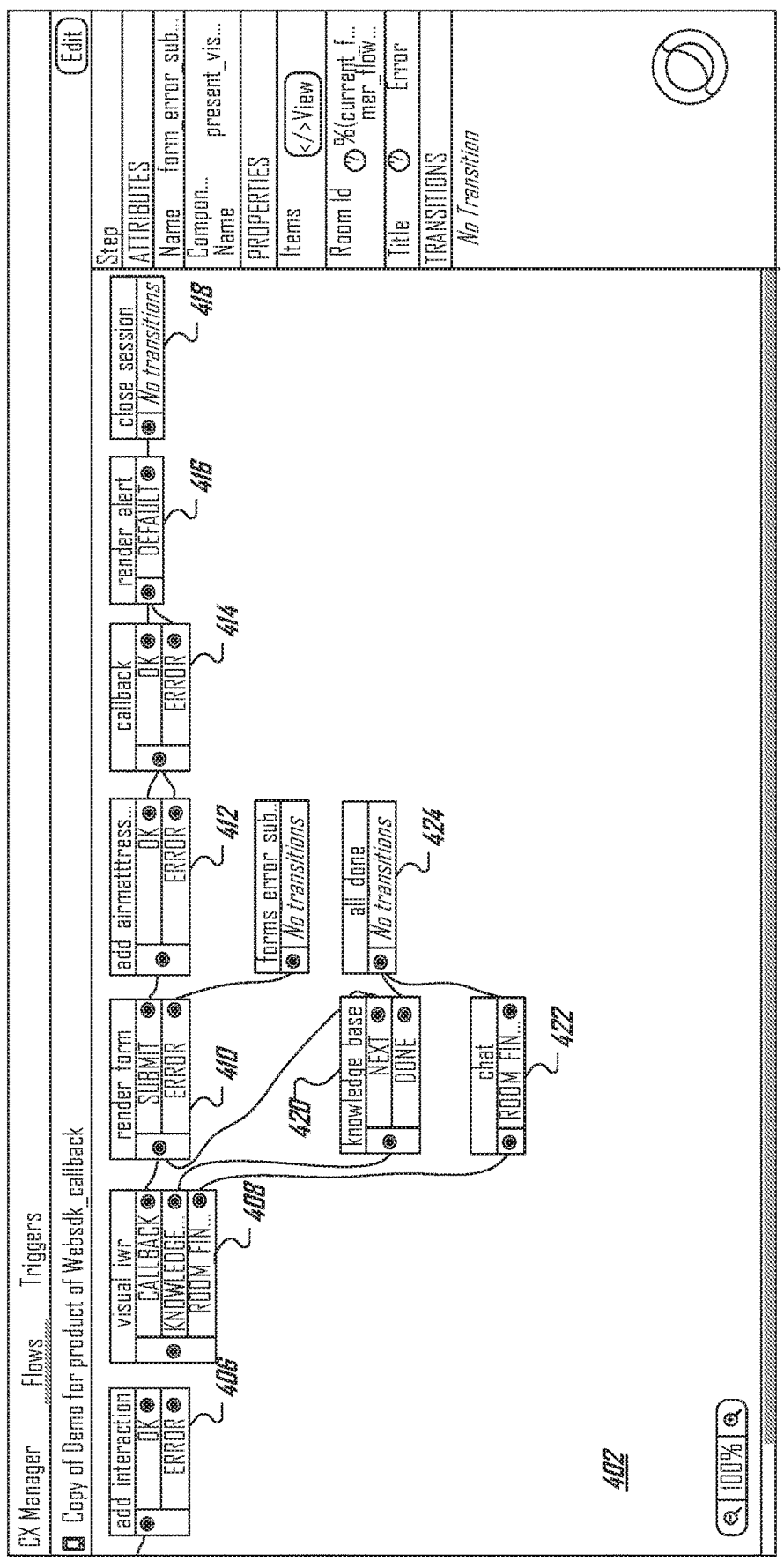
FIG. 4 illustrates an example graphical user interface to visually program a self-service workflow.

FIG. 4 illustrates an example graphical user interface 400 to visually program a self-service workflow. The graphical user interface 400 includes a workspace 402 to which functional blocks 404 (shown as 406, 408, 410, 412, 414, 416, 428, 420, 422, 424) may be added.

The blocks provides a workflow to render an interaction (406), generate visualization for an interactive voice response (408), render a form (412), render an alert (414), and close a session. The generate visualization for an interactive voice response (408) provides a link to a knowledge base block (420) as well as a chat session (422).

FIG. 5 shows a second graphical user interface 502 to program a self-service workflow. In interface 502, text associated with a given block may be inserted and modified. Indeed, the visual-based programming employs modularized executable instructions that can be instantiated a graphical element that can be quickly assembled and/or linked to other modularized executable instructions without programming language proficiencies.

Example Computer System

Figure 6:
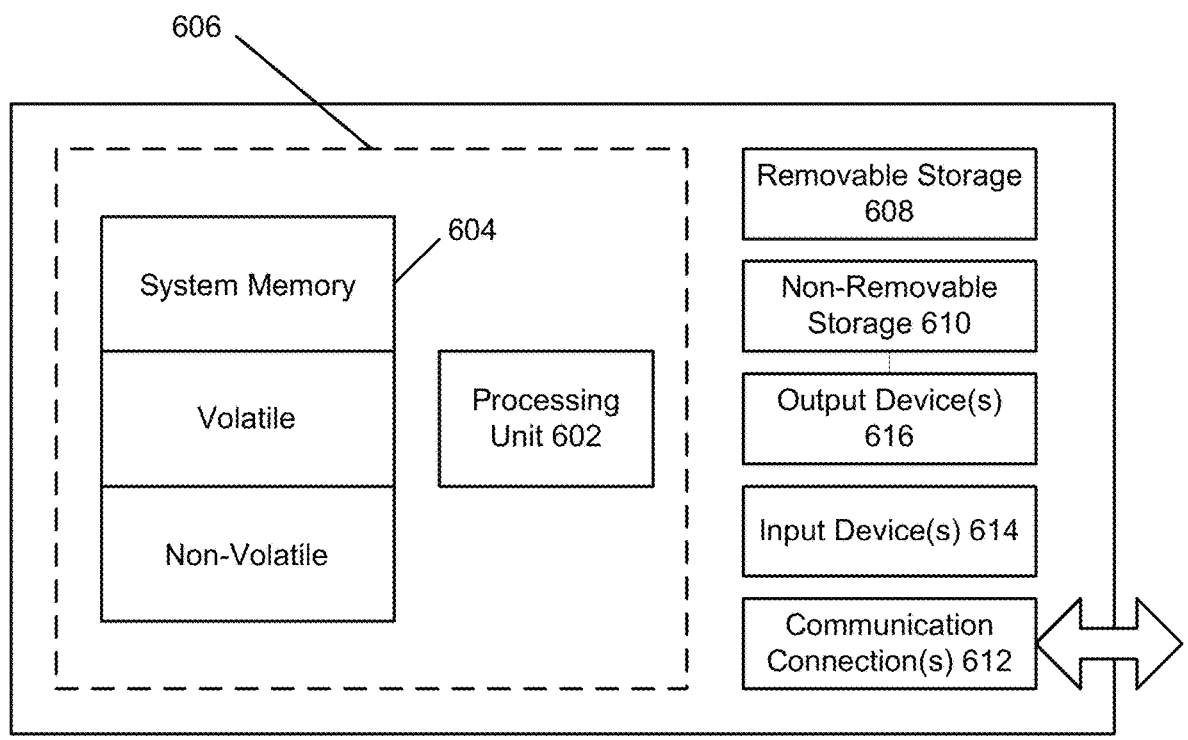
FIG. 6 shows an exemplary computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of tangible computer readable media. Computer readable media can be any available tangible media that can be accessed by device 600 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Returning to FIG. 1, agent(s) 120 and customers 110 may communicate with each other and with other services over the network 130. For example, a customer calling on telephone handset may connect through the PSTN and terminate on a private branch exchange (PBX). A video call originating from a tablet may connect through the network 130 terminate on the media server. A smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. In yet another example, Social media, email, SMS/MMS, IM may communicate with their counterpart's application (not shown) within the contact center 150.

The contact center 150 itself be in a single location or may be cloud-based and distributed over a plurality of locations. The contact center 150 may include servers, databases, and other components. In particular, the contact center 150 may include, but is not limited to, a routing server, a SIP server, an outbound server, a reporting/dashboard server, automated call distribution (ACD), a computer telephony integration server (CTI), an email server, an IM server, a social server, a SMS server, and one or more databases for routing, historical information and campaigns.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered. Campaign management may be performed by an application to design, schedule, execute and manage outbound campaigns. Campaign management systems are also used to analyze campaign effectiveness.

For inbound SIP messages, the routing server may use statistical data from reporting/dashboard information and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

The integration of real-time and non-real-time communication services may be performed by unified communications (UC)/presence sever. Real-time communication services include Internet Protocol (IP) telephony, call control, instant messaging (IM)/chat, presence information, real-time video and data sharing. Non-real-time applications include voicemail, email, SMS and fax services. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

Recording applications may be used to capture and play back audio and screen interactions between customers and agents. Recording systems should capture everything that happens during interactions and what agents do on their desktops. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center. Reports are presented in narrative, graphical or tabular formats. Reports can be created on a historical or real-time basis, depending on the data collected by the contact center applications. Dashboards typically include widgets, gadgets, gauges, meters, switches, charts and graphs that allow role-based monitoring of agent, queue and contact center performance. Unified messaging (UM) applications include various messaging and communications media (voicemail, email, SMS, fax, video, etc.) stored in a common repository and accessed by users via multiple devices through a single unified interface.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer implemented method to configure a self-service knowledge center, the method comprising:
    generating, by a processor of a first computing device, a graphical user interface for a programming workspace corresponding to the self-service knowledge center, the programming workspace comprising:
        one or more user selectable input to add a software module associated with flow of the self-service knowledge center, said software module using statistical data and routing database information for call routing with said flow of the self-service knowledge center, and
        one or more software modules to invoke an interaction session request between a user and an agent of a contact center associated with the self-service knowledge center, said one or modules comprising an intent inference module to infer the user's intent from the interaction session.

2. The method of claim 1 further comprising one or more software modules for utilizing user information records for connecting the user to the agent, wherein said agent is selected from a plurality of agents at least in part based on the user information records.

3. The method of claim 2 wherein said agent is selected by the one or more software modules from among a plurality of agents based at least in part on agent skills data.

4. The method of claim 1 wherein said agent is selected by the one or more software modules from among a plurality of agents based at least in part on one or more social networks associated with the user.

5. The method of claim 1 wherein said agent is selected by the one or more software modules from among a plurality of agents based at least in part on a network graph representing user relationships in one or more social networks.

6. The method of claim 1 wherein said agent is selected by the one or more software modules from among a plurality of agents based at least in part on cloud-based third-party data sources.

7. The method of claim 1 wherein the interaction session request comprises a chat messaging interaction or a voice interaction, and wherein the workspace is capable of generating executable code for execution by a web server to host the self-service knowledge center.

8. A system to configure a self-service knowledge center, the system comprising:
    a processor; and
    a memory having instructions stored thereon, wherein execution of the instructions by the processor cause the processor to:
        generate a graphical user interface for a programming workspace corresponding to the self-service knowledge center, the programming workspace comprising:
            one or more user selectable input to add a software module associated with flow of the self-service knowledge center, said software module using statistical data and routing database information for call routing with said flow of the self-service knowledge center, and
            one or more software modules to invoke an interaction session request between a user and an agent of a contact center associated with the self-service knowledge center, said one or modules comprising an intent inference module to infer the user's intent from the interaction session.

9. The system of claim 8 further comprising one or more software modules for utilizing user information records for connecting the user to the agent, wherein said agent is selected from a plurality of agents at least in part based on the user information records.

10. The system of claim 9 wherein said agent is selected by the one or more software modules from among a plurality of agents based at least in part on agent skills data.

11. The system of claim 8 wherein said agent is selected by the one or more software modules from among a plurality of agents based at least in part on one or more social networks associated with the user.

12. The system of claim 8 wherein said agent is selected by the one or more software modules from among a plurality of agents based at least in part on a network graph representing user relationships in one or more social networks.

13. The system of claim 8 wherein said agent is selected by the one or more software modules from among a plurality of agents based at least in part on cloud-based third-party data sources.

14. The system of claim 8 wherein the interaction session request comprises a chat messaging interaction or a voice interaction, and wherein the workspace is capable of generating executable code for execution by a web server to host the self-service knowledge center.

15. A non-transitory computer-readable medium to configure a self-service knowledge center, the computer-readable medium comprising instructions stored thereon, wherein execution of the instructions by the processor cause the processor to:
    generate a graphical user interface for a programming workspace corresponding to the self-service knowledge center, the programming workspace comprising:
        one or more user selectable input to add a software module associated with flow of the self-service knowledge center, said software module using statistical data and routing database information for call routing with said flow of the self-service knowledge center, and one or more software modules to invoke an interaction session request between a user and an agent of a contact center associated with the self-service knowledge center, said one or modules comprising an intent inference module to infer the user's intent from the interaction session.

16. The computer-readable medium of claim 15 further comprising instructions whereby one or more software modules for utilizing user information records for connecting the user to the agent, wherein said agent is selected from a plurality of agents at least in part based on the user information records.

17. The computer-readable medium of claim 16 further comprising instructions whereby said agent is selected by the one or more software modules from among a plurality of agents based at least in part on agent skills data.

18. The computer-readable medium of claim 15 further comprising instructions whereby said agent is selected by the one or more software modules from among a plurality of agents based at least in part on one or more social networks associated with the user.

19. The computer-readable medium of claim 15 further comprising instructions whereby said agent is selected by the one or more software modules from among a plurality of agents based at least in part on a network graph representing user relationships in one or more social networks.

20. The computer-readable medium of claim 15 further comprising instructions whereby:
said agent is selected by the one or more software modules from among a plurality of agents based at least in part on cloud-based third-party data sources;
the interaction session request comprises a chat messaging interaction or a voice interaction; and
the workspace is capable of generating executable code for execution by a web server to host the self-service knowledge center.

* * * * *